United States Patent [19]

Melisz et al.

[11] Patent Number: 4,481,246
[45] Date of Patent: Nov. 6, 1984

[54] MICROSCOPE SLIDE WITH RAISED MARKING SURFACE

[75] Inventors: John M. Melisz, Portsmouth; Frank H. Jellinek, Rye, both of N.H.

[73] Assignee: Sybron Corporation, Rochester, N.Y.

[21] Appl. No.: 441,448

[22] Filed: Nov. 15, 1982

[51] Int. Cl.³ .............................................. G02B 21/34
[52] U.S. Cl. .................................... 428/210; 350/534; 350/535; 350/536; 356/244
[58] Field of Search ................ 428/210; 350/534, 535, 350/536; 356/244

[56] References Cited

U.S. PATENT DOCUMENTS 3,471,312 10/1969 Muenchinger et al. ........ 428/210 X
3,481,659 12/1969 Rosenberg .......................... 350/535
3,965,888 6/1976 Bender ............................ 356/244 X
4,087,154 5/1978 Menzel ............................... 350/534

FOREIGN PATENT DOCUMENTS 1077881 8/1967 United Kingdom ................ 350/536

OTHER PUBLICATIONS

IBM. Tech. Bulletin, Hist. Spec. Slide, vol. 12, No. 4, Sep. 1960, p. 573.

Primary Examiner—George F. Lesmes
Assistant Examiner—Nancy A. B. Swisher
Attorney, Agent, or Firm—Robert A. Gerlach; Robert J. Bird

[57] ABSTRACT

A microscope slide having a raised marking surface formed of pigmented resinous material, such as an epoxy resin, which dries to a matte finish which is absorptive and retentive of marking ink.

1 Claim, 3 Drawing Figures

MICROSCOPE SLIDE WITH RAISED MARKING SURFACE

BACKGROUND AND SUMMARY OF THE INVENTION

This invention relates to a microscope slide and more particularly to one having a coated portion providing a raised marking or writing surface.

Typical microscope slides of the prior art include a "frosted" portion as a marking surface. This frosted area is created by sandblasting, acid etching, mechanical abrading, or other method of roughening the surface of the glass so that a permanent marking surface is created to accept marking by pen, pencil, or other marking instrument. All of these techniques create a frosted surface by removing material from the glass surface, therefore necessarily resulting in a marking surface which is recessed from, or certainly no higher than, the surface of the glass slide. Furthermore, such frosted glass, while providing a matte surface on the glass, does not result in a marking surface having a pronounced background to contrast with information to be written thereon.

It is an object of this invention to provide a microscope slide having a raised marking surface which is absorptive and receptive to marking materials, which is pigmented to provide a visual contrast to such marking surface, which is resistant to a variety of laboratory solvents, reagents, stains or chemicals and which may also be produced in a variety of colors to facilitate color coding.

DRAWING

DESCRIPTION

Figure 1:
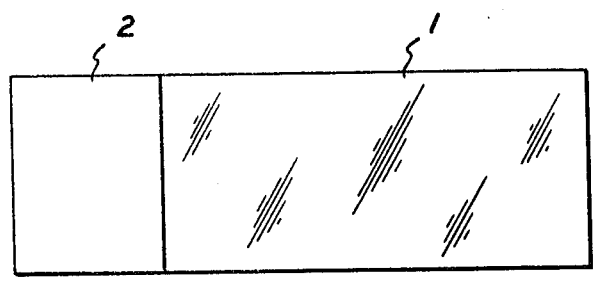
FIG. 1 is a top plan view of the microscope slide according to this invention.
Figure 2:
FIG. 2 is a front elevation view of the slide shown in FIG. 1.

Referring to FIGS. 1 and 2, a glass microscope slide is shown at 1, having conventional length, width and thickness. On a portion or portions thereof, the left end as shown in the drawing, is added a coating 2 of an epoxy or other resinous material, this coating 2 having a finite thickness and therefore providing a raised surface relative to the surface of the glass slide.

The epoxy coating 2 applied to the glass slide includes a pigment to give it a bright contrasting background (e.g. white or various colors) to receive marking and therefore to provide good visibility to any markings placed thereon. The epoxy or other resinous material also includes a granular medium to impart porosity and a permanent matte finish to the coating for accepting marking to individually identify the final use of the slide. This coating accepts the marking of all commonly used laboratory marking instruments, such as felt-tip marking pens, india ink, ballpoint pen ink and pencil. The coating forms an absorptive surface capable of holding and retaining the marking, through laboratory procedures in which laboratory solvents and chemicals are commonly used, as well as or better than glass frosted surfaces, depending on the characteristics of the marking device.

Conventional etched or sandblasted slides do not assure such permanent identification. In addition, the common practice of attaching an adhesive backed paper label to slides does not provide permanent labeling because such paper labels are subject to falling off, peeling off or washing off when subjected to solvents and the like.

Figure 3:
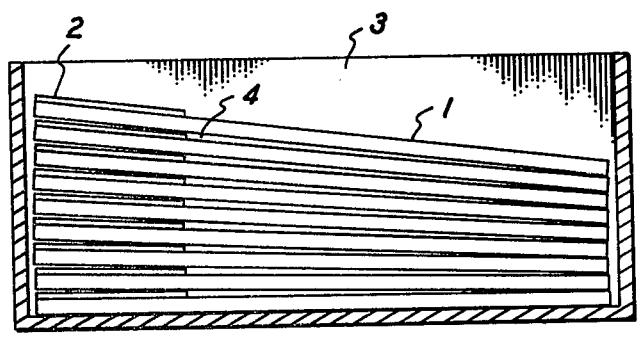
FIG. 3 is representative of a stack of such slides as packaged.

FIG. 3 illustrates an additional benefit to the microscope slides of this invention. When these slides are packaged as in container 3, the finite thickness of the coating 2 provides a small degree of spacing 4 between slides in a stack, thereby avoiding mechanical contact of one surface on another. This eliminates or reduces abrasion between the slides and sticking of one slide on another. A cleaner scratch-free and more easily handled slide results.

It will be appreciated that the relative dimensions of glass slide 1 and coating 2 in the drawing are exaggerated for the sake of illustration.

The raised surface provided by the coating 2 is typically about 0.0003" to 0.0008" thick. It provides an effective mechanical barrier to liquid flow of specimen in the direction of the coating.

What is claimed is:

1. A microscope slide so configured with a raised portion at one end thereof that a plurality of such slides are stackable without extended area contact between them for substantially scratch-free packaging, said slide comprising:
   a flat glass plate on which said raised portion is a marking surface formed of a coating of an epoxy resin on said glass plate,
   said epoxy resin including a granular medium to impart porosity to said coating and a pigment to provide visual contrast to said coating to enhance visibility of marking to be placed thereon,
   said raised marking surface being effective to provide a barrier to prevent the spread of liquid sample, placed upon said slide, onto said marking surface.

* * * * *